Jan. 27, 1925.   1,524,625
V. W. MASON
CONTROLLING MEANS FOR FRICTION HOISTING MACHINES
Filed Aug. 14, 1924    2 Sheets-Sheet 1

WITNESSES:

INVENTOR,
Volney W. Mason
BY
ATTORNEYS.

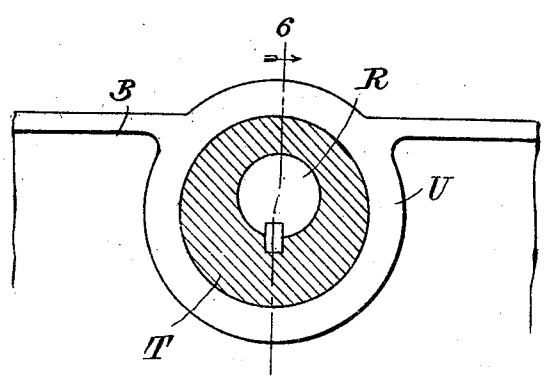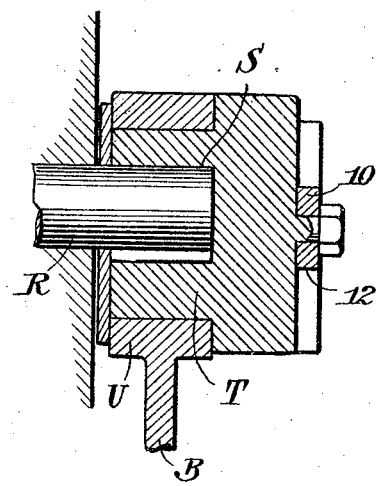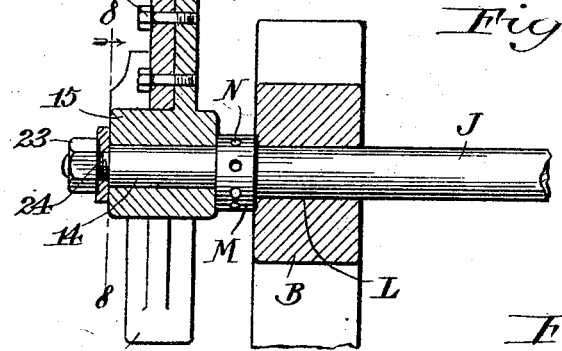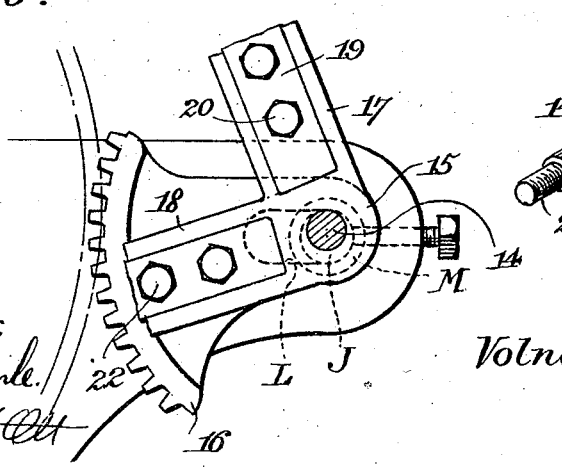

Patented Jan. 27, 1925.

1,524,625

UNITED STATES PATENT OFFICE.

VOLNEY W. MASON, OF PROVIDENCE, RHODE ISLAND.

CONTROLLING MEANS FOR FRICTION HOISTING MACHINES.

Application filed August 14, 1924. Serial No. 732,090.

*To all whom it may concern:*

Be it known that I, VOLNEY W. MASON, a citizen of the United States, and resident of Providence, in the county of Providence and State of Rhode Island, have invented a new and Improved Controlling Means for Friction Hoisting Machines, of which the following is a full, clear, and exact description.

This invention has relation to friction hoisting machines of the type set forth in United States Letters Patent No. 397,243 and has particular reference to an improvement in the controlling means therefor.

In the prior patent above noted the eccentric or cam which controlled the movement of the friction wheel respectively to active engagement with the frictional driving roller, to braking position in engagement with the brake or to an intermediate position for overhauling or lowering the load, was controlled by a rock lever in turn also connected with a control rope or cable trained over pulleys. In this case the rock lever of necessity was made of extreme length in order to obtain the proper leverage or else the cable was trained over a sufficient number of pulleys to reduce the power necessary to operate the cam or eccentric. In either instance and in actual practice, the operator of the machine had to pull the control rope a distance of from twenty-four inches to twenty-eight inches with all his strength when hoisting to capacity.

To overcome the above-recited objections and disadvantages the present invention comprehends a controlling means which includes a plurality of rock levers operatively connected by intermeshing quadrant gears or gear segments which function to increase the leverage and hence decrease the power required to actuate the controlling means in addition to requiring a lighter counterbalance weight and a reduction in the space necessary to accommodate a complete machine. It is therefore obvious that with the improved controlling means the operator has only to pull the lever through a distance of approximately twelve inches and this may be accomplished with a minimum exertion and force compared to the old plan, in addition to obtaining a more sensitive and instantaneous control of the load whether hoisting, lowering, or braking the same.

The invention furthermore comprehends an improved controlling means by virtue of which the machine is more readily, more directly and more positively controlled than by the previous controlling means set forth in the prior patent.

As a further object the invention contemplates a means for properly maintaining the pitch line of the intermeshing quadrant gears or gear segments when adjustment of the brake shoe supporting elements which also carry one of the quadrant gears or gear segments is shifted to compensate for wear on the brake lining.

The invention aims as a still further object to generally improve the controlling means for the machine without materially adding to the expense of production or complicating the structure whereby a more efficient machine is provided.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 5 is a fragmentary detail view of the operating cam or eccentric for shifting the friction wheel to its driving, braking and intermediate positions;

Figure 6 is a fragmentary detail sectional view taken approximately on the line 6—6 of Figure 5;

Figure 7 is a fragmentary detail sectional view taken approximately on the line 7—7 of Figure 1;

Figure 8 is an enlarged sectional view taken approximately on the line 8—8 of Figure 7; and Figure 9 is a fragmentary perspective view of the brace rod illustrating the quadrant gear journal or fulcrum.

Figure 1:
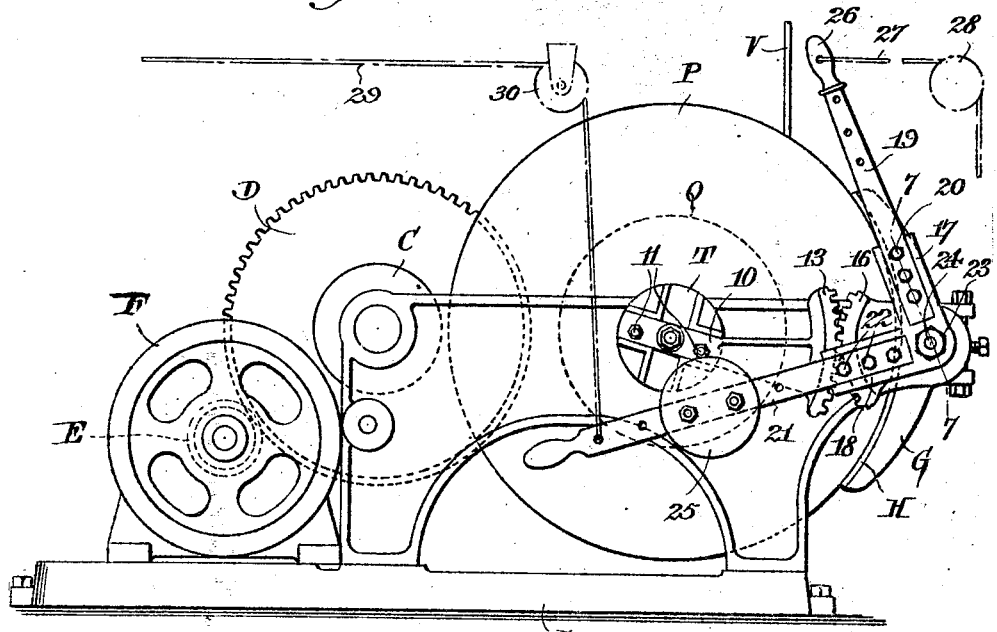
Figure 1 is a side view of the machine illustrating the same in braking position.
Figure 2:
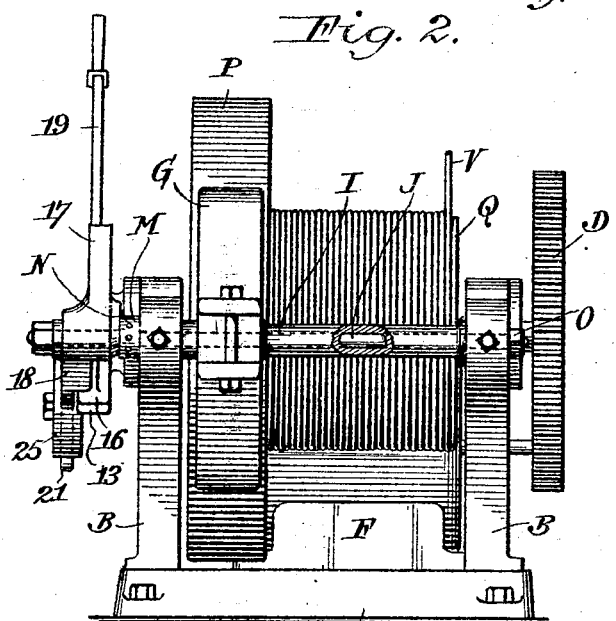
Figure 2 is an end view thereof.

Referring to the drawings by characters of reference the machine includes a base A having vertical side frame sections B spaced apart and in which is mounted at one end the friction driving roller C which is driven by a reduction gear D from the motor pinion E of a motor F. At the opposite end of the frame a brake shoe G having a brake lining H is attached to a tubular brake shoe supporting shaft I which is mounted transversely between the frame sections B and has extending therethrough a brace rod J, which brace rod extends through slots or guideways L in the frame sections. The ends of the brace rod extend outwardly beyond the sides of the frame sections and one end is provided with a collar M having radial openings N. The opposite end of the rod J is threaded to receive a nut O which serves to tie the frame sections B together and to hold the rod J against relative movement in the slots or guideways L. The machine further includes a friction wheel P and a cable drum Q which are secured together and rotate on a transverse shaft R. The opposite ends of the transverse shaft R are keyed to the rotary eccentric or cam members T which are mounted in the bearings U of the frame sections B. It thus follows that upon rotation of the eccentric or cam members T the shaft R together with the friction wheel P and cable drum Q will be shifted longitudinally of the frame whereby the friction wheel is operatively engaged with the friction driving roller C to wind the hoisting cable V upon the cable drum Q, or to a position whereby the friction wheel P is brought into contact with the brake G for preventing movement of the drum or into an intermediate position to permit overhauling or free unwinding of the cable V from the drum.

Figure 3:
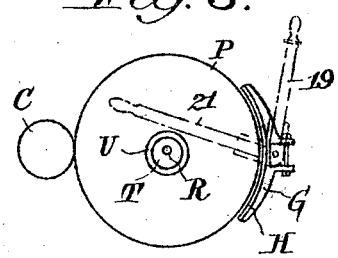
Figures 3 and 4 are diagrammatic views illustrating the position of parts when the machine is respectively in its driving position and neutral position.
Figure 4:
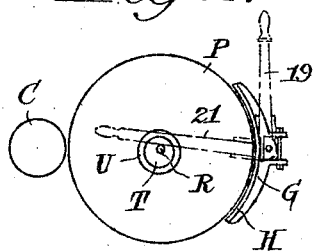

The foregoing approximately outlines the general construction of a friction hoisting machine constructed substantially in accordance with that disclosed by the prior Patent No. 397,243. The improved controlling means constituting the present invention and which is designed for the purpose of effecting a rotary movement of the bearing member T for the shaft R whereby to shift said shaft and friction wheel P, consists of a lever 10 which is bolted or otherwise secured as at 11 in the grooves 12 formed of an outer side of one of the bearings T. The lever 10 is provided at its outer end with a quadrant gear or gear segment 13. The end of the brace rod J provided with a collar M is provided with a reduced eccentric outwardly projecting stud 14 which constitutes a bearing spindle for a hub 15 which hub has secured thereto a gear segment or quadrant gear 16 the teeth of which mesh with the teeth of the gear segment or quadrant gear 13. The hub 15 is further provided with angularly disposed radial lever sockets 17 and 18. A lever 19 is positioned in the lever socket 17 and secured in place by bolts 20. A lever 21 is positioned in the lever socket 18 and secured in place by bolts 22. The hub 15 is maintained in place by a nut 23 engaged on the reduced threaded end 24 of the stud or spindle 14. The lever 21 has adjustably mounted thereon a counterbalance weight 25 which functions by the force of gravity to normally swing the lever 21 and, through the intermeshing gear segments or quadrant gears 16 and 13, the lever 10 downwardly whereby the bearing T as illustrated in Figure 1 is rotated in a clockwise direction to shift the shaft R and the friction wheel P into engagement with the lining H of the brake shoe G so that the machine is normally in brake. Where the machine is to be operated directly by an operator, the said operator grasps the hand grip 26 at the free end of the lever 19 and swings said lever as illustrated in Figure 1 to the right to the full extent of its movement and to the position illustrated in dotted lines in Figure 3 whereby the friction wheel P is moved from a braking position to a driving position in frictional contact with the friction driving roller C. The movement of the lever 19 to an intermediate position as illustrated in dotted lines in Figure 4, disposes the friction wheel P in an intermediate position whereby the same is brought out of contact with the brake shoe lining H and the friction driving roller C so that the free unwinding of the cable or overhauling of the machine is permitted. In some instances it may be found desirable to control the machine by an operator at a distance therefrom, in which event a cable 27, illustrated in broken lines in Figure 1, is connected at one end with the lever 19 and is trained over suitable guide sheaves 28 to be led to the desired point of operation. In other instances it may be found desirable to control the machine by an operator at a distance by connecting a cable 29 to the lever 21, and training the same over a guide sheave 30, and thence leading the cable to the point of operation, all of which is illustrated in broken lines in Figure 1.

In view of the fact that the space between the friction wheel and the brake shoe lining H varies due to wear and it is expedient to advance the brake shoe toward the friction wheel to compensate the said wear, it is apparent that the shifting of the brace rod J and tubular shaft I would interfere with the pitch line of the intermeshing gear segments or quadrant gears 13 and 16. In order to properly maintain the pitch line of the intermeshing gears when the brake adjustment is made, the brace rod J is rotated so that the eccentric stud or spindle 14 is moved relatively to the bearing elements T.

From the foregoing it will thus be seen that an improved controlling means for friction hoisting machines has been provided by virtue of which a more direct and positive control is obtained in addition to effecting a reduction in the amount of space to accommodate the machine and a reduction in the weight of the counterbalancing weight.

I claim:

1. The combination with a friction hoisting machine including an eccentrically mounted hoisting drum and friction driven wheel respectively movable by rotation of its eccentric mounting into engagement with a friction driving element and a stationary brake element or to an intermediate position for free movement, of means for rotating said eccentric mounting to move the drum and friction wheel comprising an operating lever fulcrumed to the machine and intermeshing leverage increasing gear segments carried respectively by the operating lever and the eccentric mounting.

2. The combination with a friction hoisting machine including an eccentrically mounted hoisting drum and friction driven wheel respectively movable by rotation of its eccentric mounting into engagement with a friction driving element and a stationary brake element or to an intermediate position for free movement, of means for rotating said eccentric mounting to move the drum and friction wheel comprising an operating lever fulcrumed to the machine and intermeshing leverage increasing gear segments carried respectively by the operating lever and the eccentric mounting and a counterbalance weight connected with the lever gear segment for normally effecting rotation of the eccentric mounting to move the friction wheel to braking engagement with the brake.

3. The combination with a friction hoisting machine which includes a spaced brake and friction driving member and an eccentrically mounted drum and driven member operable upon rotation of the eccentric mounting to shift the drum and driven member into engagement with the driving member or brake or to an intermediate free position, of means for shifting said friction driven member and drum intermeshing leverage increasing gear segments one of which is connected to the eccentric mounting, and an operating lever connected with the other gear segments.

4. The combination with a friction hoisting machine which includes a spaced brake and friction driving member and an eccentrically mounted drum and driven member operable upon rotation of the eccentric mounting to shift the drum and driven member into engagement with the driving member or brake or to an intermediate free position, of means for shifting said friction driven member and drum intermeshing leverage increasing gear segments one of which is connected to the eccentric mounting, and an operating lever connected with the other gear segments, the said brake being adjustable toward the friction driven member to compensate for wear and the said operating lever and its gear segment being mounted upon the brake supporting means, the fulcrum for said lever and its gear segment including means for maintaining the proper pitch line of the gear segments upon adjustment of the brake.

5. In a machine which includes a spaced stationary brake, a friction driving member, a friction driven member and a rotary eccentric bearing means for said friction driven member to shift the driven member respectively into engagement with the driving member and brake or to an intermediate disengaged position, the combination therewith of operating and controlling means for the eccentric bearing member comprising an arm secured to the eccentric bearing member, a gear segment at the free end of the arm, a fulcrumed arm having a gear segment at its free end meshing with the first gear segment and a lever connected with the latter arm for moving the same at its gear segment as and for the purpose specified.

6. A controlling and operating means for friction hoisting machines of the character set forth comprising in combination with the eccentrically mounted shiftable friction driven element a pair of leverage increasing gear segments, one of which is connected with eccentric mounting for said driven element, an operating lever to which the remaining gear segment is attached and a weight element having connection with the latter gear segment for normally moving the eccentric mounting in one direction.

7. A controlling and operating means for friction hoisting machines which include a spaced friction driving element and adjustable brake, a friction driven member and drum and an eccentric mounting therefor for respectively shifting the friction driven element into engagement with the driving element and brake or for shifting the same to an intermediate non-engaging position, said controlling and operating means comprising leverage increasing gear segments one of which is secured to the eccentric mounting, a weighted member connected with the other gear segment and means connected with said other gear segment for rocking the same against the action of the weighted means.

8. A controlling and operating means for friction hoisting machines which include a spaced friction driving element and adjustable brake, a friction driven member and drum and an eccentric mounting therefor for respectively shifting the friction driven element into engagement with the driving element and brake or for shifting the same to an intermediate non-engaging position, said controlling and operating means comprising leverage increasing gear segments one of which is secured to the eccentric mounting, a weighted member connected with the other gear segment and means connected with said other gear segment for rocking the same against the action of the weighted means, the said other gear segment being fulcrumed upon the brake supporting means and means for maintaining the proper pitch line engagement of said gear segments when the brake is adjusted.

9. A controlling and operating means for friction hoisting machines which include a spaced friction driving element and adjustable brake, a friction driven member and drum and an eccentric mounting therefor for respectively shifting the friction driven element into engagement with the driving element and brake or for shifting the same to an intermediate non-engaging position, said controlling and operating means comprising leverage increasing gear segments one of which is secured to the eccentric mounting, a weighted member connected with the other gear segment and means connected with said other gear segment for rocking the same against the action of the weighted means, the said other gear segment being fulcrumed upon the brake supporting means and means for maintaining the proper pitch line engagement of said gear segments when the brake is adjusted, said latter means comprising an eccentric spindle carried by the brake supporting means.

VOLNEY W. MASON.